United States Patent [19]
Okita

[11] Patent Number: 4,637,010
[45] Date of Patent: Jan. 13, 1987

[54] DISC CLAMP DEVICE
[75] Inventor: Masao Okita, Furukawa, Japan
[73] Assignee: Alps Electric Co., Ltd., Japan
[21] Appl. No.: 718,900
[22] Filed: Apr. 2, 1985
[30] Foreign Application Priority Data
  Apr. 2, 1984 [JP] Japan .............................. 59-48292[U]
[51] Int. Cl.⁴ .......................... A63D 7/00; G11B 3/62
[52] U.S. Cl. ....................................... 369/270; 360/99
[58] Field of Search ............. 369/270, 271, 290, 292; 360/97, 133, 135, 99

[56] References Cited
U.S. PATENT DOCUMENTS
4,358,803 11/1982 Van Der Giessen ................ 360/97
4,408,318 10/1983 Sugiura ............................... 369/270
4,420,830 12/1983 Green ................................. 369/270

Primary Examiner—Steven L. Stephan
Attorney, Agent, or Firm—Guy W. Shoup

[57] ABSTRACT

A disc clamp device of the type in that a hub frame is provided elevatably above a turntable and a clamp member fittable with the turntable is mounted on a hub shaft inserted through the hub frame. The hub shaft has a stop member outside the hub frame and a spring rest inside the hub frame, with a clamp spring interposed between the spring rest and the clamp member. The spacing between the stop member and the spring rest is selected larger than the thickness of the hub frame.

4 Claims, 7 Drawing Figures

DISC CLAMP DEVICE

FIELD OF THE INVENTION

The present invention relates to a disc clamp device, provided inside a recording/reproducing device such as the magnetic disc drive device, for holding a disc to give a turning force thereto.

BACKGROUND OF THE INVENTION

Some recently-marketed information processors employ the magnetic recording/reproducing device. This recording/reproducing device operates in such a manner that after a flexible magnetic disc is placed on a turntable, this turntable is driven to rotate the disc. While it is rotated, a pickup element is opposed to the disc to perform recording and reproducing of information.

FIGS. 1 through 3 illustrate at respective operation stages an example of the conventional disc clamp device employed in such a recording/reproducing device.

FIG. 1 shows the initial state where a hub frame 1 is positioned at the top dead point. When the magnetic disc 3 is loaded on the turntable 2, the hub frame 1 moves down.

From the hub frame 1 a hub shaft 4 is suspended, to the lower end of this hub shaft 4 a clamp member 5 is attached. This clamp member 5 is composed of a hub 5a and a collet 5b positioned inside the hub 5a, which collet is mounted slidably on the hub shaft 4 via a bearing 6.

As the hub frame 1 moves down, the clamp member 5 also moves down at the same time. Then, a tapered frame 5c of the hub 5a enters first into a center hole 3a of the magnetic disc 3. Thereafter, the center hole 3a is guided by the tapered frame 5c, whereby the provisional centering action is performed. During the above, the hub 5a is brought inside a concave portion 2a formed in the turntable 2 (the state shown in FIG. 2). As the hub frame 1 moves down further, the hub 5a abuts upon the bottom of the concave portion 2a of the turntable 2 and the hub shaft 4 moves up relatively. During the above, the collet 5b is pushed by a clamp spring 7 interposed between the collet 5b and the hub frame 1 and moves down inside the hub 5a. Because plural slits (not shown) are formed in the tapered face 5c of the hub 5a, the tapered face 5c is expanded by the downward movement of the collet 5b. Thus, the center hole 3a of the magnetic disc 3 is pushed in horizontal directions, whereby the position of its axis is corrected to accord with the axis of the concave portion 2a (the subject centering action). During the above, pressing face 5d of the hub 5a pushes the magnetic disc 3 onto the upper surface of the turntable 2 and clamps the same there. The number 8 indicates a return spring to return the collet 5b to its initial pose.

However, the foregoing conventional disc clamp device has the following problems:

(1) As shown in FIG. 1, if the centering action is performed while the hub 5a has the axial discrepany of Δx relative to the axial center of the turntable 2, a frictional force at abutting portions between the hub frame 1 and the clamp spring 7 becomes large because the pressure of the clamp spring 7 is applied to the hub frame 1, thus, the hub shaft 4 can hardly move in the direction of correcting the axial discrepancy. As a result, the provisional centering action can not take place sufficiently, accordingly, there are such inconveniencies as that the inner periphery of the magnetic disc 3 is bitten into the concave portion 2a of the turntable 2 thereby to suffer damage, or, the tapered face 5c of the hub 5a becomes scratched also.

(2) If the turntable 2 is rotated without eliminating the axial discrepancy, it naturally causes irregular rotation or runout, and the conventional device is hardly applicable, specifically, to a recently-developed high-density information input system where the track pich is narrowed.

(3) Against such inconveniences, they could be overcome by mating accurately the axial center of the hub shaft 4 on which the clamp member 5 is mounted with the axial center of the turntable 2 at the time of assembling, but, this work is not efficient and can not deal with the aged axial discrepancy.

(4) This type of disc clamp device achieves its clamping operation by the use of a one-way closing mechanism. Accordingly, as shown in FIG. 4, the hub frame 1 in the initial state is stationary in the inclined pose. At this time, the clamp member 5 is also held in the inclined pose because it is receiving the pressure of the clamp spring 7. Therefore, as will be clear from the drawing, in order to avoid touching of a jacket 9, having a thickness of t and housing the magnetic disc 3, with one side of the hub 5a, the inclination angle of the hub frame 1 must be selected large. Thus, there is the difficulty that the device could not be made in a thin-sized body.

SUMMARY OF THE INVENTION

The present invention has been devised in view of the foregoing problems of the prior art, and its object is to provide a disc clamp device which is simple in structure, good in working efficiency, permits precise setting of the disc without causing damage on the disc, hub and the like, and can be embodied in a thin-sized body.

In brief, the disc clamp device according to the present invention is characterized in that above a turntable a hub frame is provided elevatably, on a hub shaft inserted through the hub frame a clamp member is mounted fittable with the turntable, at the tip of the hub shaft a stop member is provided outside the hub frame, on the hub shaft a spring rest is mounted inside the hub frame and slidably in the axial direction, and, between the spring rest and the clamp member a clamp spring is interposed, whereby the pushing force of the clamp spring does not act directly on the hub frame.

DETAILED DESCRIPTION OF THE INVENTION

Figure 1:
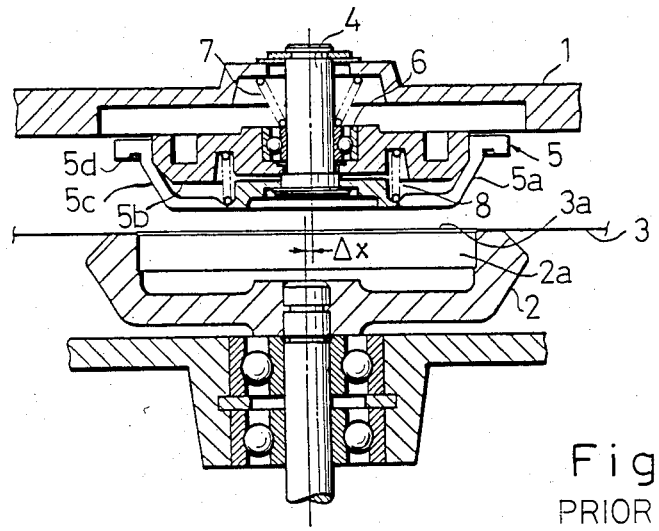
FIGS. 1 through 3 are sectional views of the conventional disc clamp device, illustrating respective operation stages.
Figure 2:
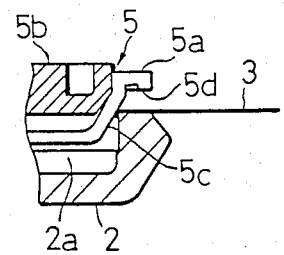
Figure 3:
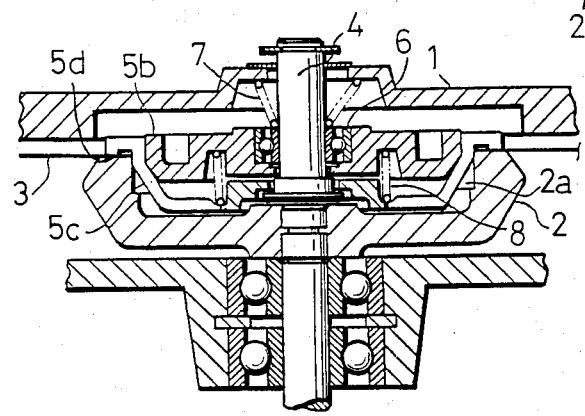
Figure 4:
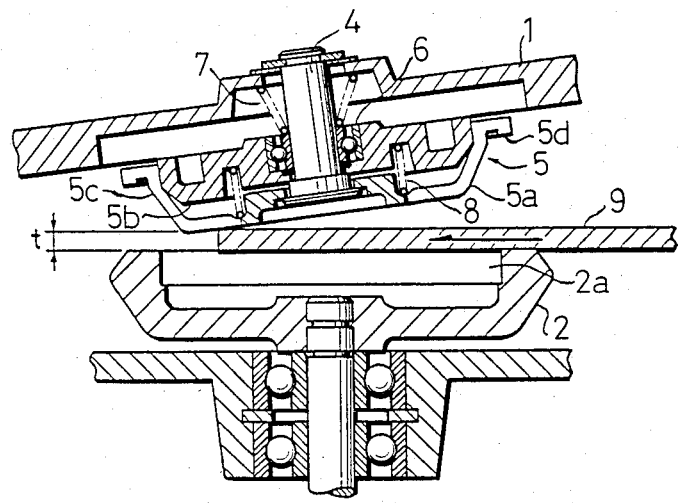
FIG. 4 is a sectional view of the conventional disc clamp device whose hub frame is of the one-way closing type.
Figure 5:
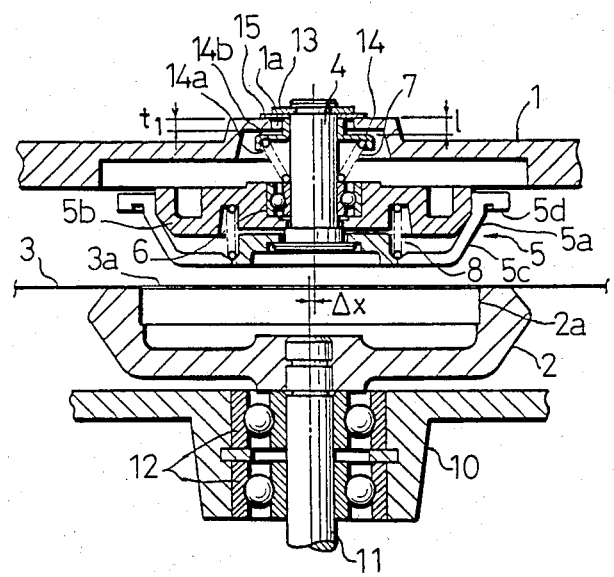
FIGS. 5 and 6 are sectional views of an embodiment of the disc clamp device according to the present invention, illustrating different operation stages.
Figure 6:
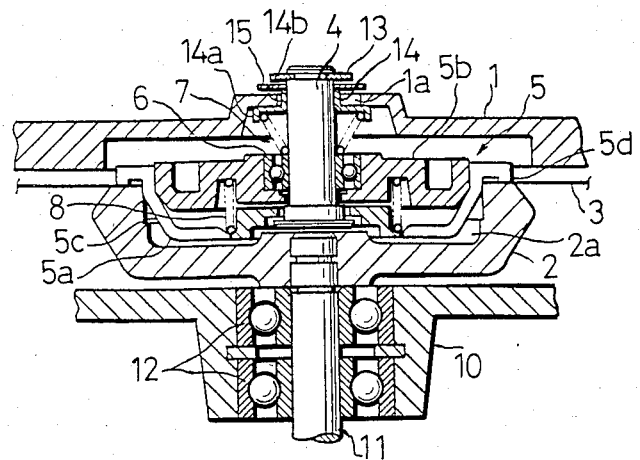
Figure 7:
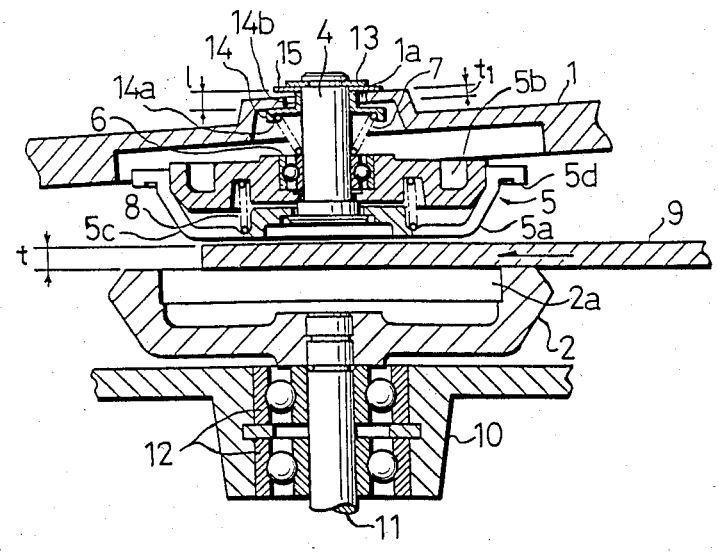
FIG. 7 is a sectional view of the embodiment of the present invention whose hub frame is of the one-way closing type.

The embodiment of the present invention will be described with reference to FIG. 5 and so forth, in which FIGS. 5 and 6 illustrate in sectional view different operation stages of the present disc clamp device and FIG. 7 illustrates in sectional view the open state of the present disc clamp device.

In these drawings, the number 10 is a base frame. On this base frame 10 a spindle 11 coupled to a motor (not shown) is supported via a bearing 12. At the upper end of this spindle 11 a turntable 2 is secured. In the center of this turntable 2 a concave portion 2a is formed. Above the turntable 2 a clamp member 5 is provided which is opposing to the turntable and spaced a certain distance from the same. This clamp member 5 is supported rotatably on the lower end of a hub shaft 4. This hub shaft 4 is suspended from a hub frame 1 which is elevatable freely. That is, in the hub frame 1 a hole 1a is bored which allows the hub shaft 4 to move radial directions, this hub shaft 4 inserted through the hole 1a is hung on the hub frame 1 by a stop member 13 attached to the upper end of the hub shaft 4. Here, the axial center of the hole 1a and that of the spindle 11 lie substantially on the same line. Below the stop member 13 a sping rest 14 is mounted on the shaft 14 with a washer 15 interposed between the stop member 13 and the spring rest 14. This spring rest 14 is composed of an expanding portion 14a opening downward and a boss 14b projecting upward from the center of this expanding portion 14a, with the upper end of the boss 14b abutting upon the washer 15. Thus, between the expanding portion 14a and the washer 15 a certain distance l is left. This distance l is selected larger than the thickness $t_1$ of the hub frame 1. Upon the expanding portion 14a one end of a clamp spring 7 abuts. The other end of this clamp spring 7 is press-abutted upon a bearing 6 supporting a collet 5b of the clamp member 5. This bearing 6 is mounted slidably on the hub shaft 4. With the outer periphery of the collet 5b a hub 5a contacts slidingly. This hub 5a is coupled to the lower end of the hub shaft 4. Between the hub 5a and the collet 5b a return spring 8 is interposed. On the outer periphery of the hub 5a there are formed a tapered face 5c fittable with the concave portion 2a of the turntable 2 and a pressing face 5d abuttable upon the upper surface of the turntable 2. The number 3 indicates a magnetic disc with its center hole designated by 3a. The number 9 shown in FIG. 7 designates a jacket housing the magnetic disc 3.

Now, the clamping operation of the disc clamp device of the foregoing structure will be described.

The hub frame 1 in the initial state is previously ascended by the action of a spring (not shown), for example. To actuate the device, the magnetic disc 3 is inserted through an insertion opening (not shown) of the recording/reproducing device, then, after the center hole 3a of the magnetic disc 3 is faced to the turntable 2, the hub frame 1 is moved down manually, for instance. In response thereto, the hub 5a of the clamp member 5 enters into the center hole 3a of the magnetic disc 3. The tapered face 5c of the hub 5a pushes the center hole 3a in horizontal directions in the drawing, at the same time, the tapered face 5c is brought inside the concave portion 2a of the turntable 2, and, while being guided by the upper margin of the concave portion 2a, the axial discrepancy relative to the spindle 11 is corrected (the provisional centering action).

That is, as shown in FIG. 5, in case the hub shaft 4 has the axial discrepancy of $\Delta x$ relative to the spindle 11, because the hub shaft 4 is suspended only from the hub frame 1 via the washer 15, i.e., since there is the room l, which is the height of the boss 14b of the spring rest 14, in contrast with the thickness $t_1$ of the hub frame 1, the hub shaft 4 can move, within the hole 1a without registance, in proportion to the movement of the hub 5a. Accordingly, the provisional centering action is performed surely, and the peripheral margin of the center hole 3a of the magnetic disc 3 can not be bitten.

As the hub frame 1 moves down further, the hub 5a abuts upon the bottom of the concave portion 2a of the turntable 2. At this stage, the pressing face 5d of the hub 5a abuts lightly upon the magnetic disc 3 (the provisional clamping action). Then, the expanding portion 14a of the spring rest 14 moves down in response to pushing by the hub frame 1. Thus, the hub shaft 4 moves up relatively. Then, the clamp spring 7 press-abutted upon the expanding portion 14a pushes the collet 5b via the bearing 6. Therefore, the hub 5a is expanded, the inner periphery of the center hole 3a of the magnetic disc 3 is pushed, and the center of the magnetic disc 3 accords perfectly with that of the spindle 11 (the subject centering action). Thereafter, in response to the collet 5b pushing the hub 5a, the pressing face 5d pushes the magnetic disc 3 onto the turntable 2 (the subject clamping action).

Through the foregoing steps, the clamping action completes.

Then, as the spindle 11 is driven by a motor, the magnetic disc 3 starts to rotate, and a pickup element (not shown) opposing to the recording surface of the magnetic disc 3 performs reading/recording of information. During the above, the clamp member 5 rotates also.

If the hub frame 1 moves up, the clamp member 5 is returned to its initial state owing to the retaining strength of the clamp spring 7, and the collet 5b is also returned to the initial state by the return spring 8.

In case the hub frame 1 employs the one-way closing mechanism, as shown in FIG. 7, the hub frame 1 is in open with an inclined pose. However, under this pose, because the hub shaft 4 is hung on the hub frame 1 with the room corresponding to the height l of the boss 14b of the spring rest 14, in contrast with the thickness $t_1$ of the hub frame 1, the clamp member 5 is maintained in the vertical state owing to its weight. Accordingly, even when the angle of inclination of the hub frame 1 is relatively small, the jacket 9 housing the magnetic disc 3 can be loaded without touching the hub 5a.

As apparent from the foregoing description, the present invention produces the following effects:

(1) Because the hub shaft has the stop member or portion at its upper end, with the spring rest coupled slidably below the stop member and the clamp spring interposed between the spring rest and the clamp member, the clamp spring does not abut directly upon the hub frame. Thus, even if the clamp member has some axial discrepancy with respect to the turntable opposing to the clamp member, the spring rest and the clamp spring can move in unison together with the hub shaft at the time of the centering action, so that there occurs no friction between the clamp spring and the hub frame. Accordingly, the correction operation against the axial discrepancy of the hub shaft is achieved precisely, and the inner periphery of the magnetic disc and the clamp member are not damaged. Thus, a longer life-time of the device is assured.

(2) As a result, the degree of centering accuracy is improved, irregular rotation and runout disappear, the device is applicable enough to the high-density information input system, and an improved reliability of the device can be realized.

(3) Because the axial discrepancy is corrected automatically, the assembling work can be simplified.

(4) Because the spacing between the stop member and the spring rest is selected larger than the thickness of the hub frame, the spring rest can move freely relative to the hub frame, thus, the centering action takes place more reliably. Further, even when the hub frame has an inclination when it is in open, provided that the hub frame is of the one-way closing types, the clamp member stands vertically owing to its weight, thus, the spacing between the clamp member and the turntable can be made as narrow as possible. Accordingly, because the inclination angle of the hub frame can be made small, the device can be embodied in a thin-sized body.

While the preferred embodiment has been described, variations thereto will occur to those skilled in the art within the scope of the present inventive concepts which are delineated by the following claims.

What is claimed is:

1. In a disc clamp device of the type having a turntable, a hub frame downwardly movable with respect to the turntable, a clamp member mounted on a hub shaft which has one end carried on the hub frame, and a spring provided on the hub shaft between the hub frame and the clamp member, the spring providing a biasing force against the clamp member when the hub is moved downwardly toward the turntable to clamp a disc between the clamp member and the turntable, the improvement comprising means for mounting the clamp member to the hub frame such that the clamp member has a freedom of angular movement relative to the hub frame when it is above the turntable, said mounting means including the hub frame having a bore of a larger diameter than the hub shaft, a stop member provided on the one end of the hub shaft, the hub shaft being disposed in said bore of the hub frame and being carried by said stop member abutting the hub frame from one side of said bore, a spring rest on the hub shaft on the other side of said bore in the hub frame at a position spaced downwardly from a lower surface of the hub frame so as to leave a spacing between said spring rest and said lower surface of the hub frame when the hub frame is in an elevated position above the turntable, and the spring having one end carried in said spring rest, said spacing and larger diameter bore providing said freedom of angular movement to the clamp member relative to the hub frame.

2. A disc clamp device as set forth in claim 1, wherein the hub frame is pivotally mounted at one side so as to be pivotally movable toward the turntable, and the diameter of said bore in the hub frame is large enough relative to the hub shaft such that the hub shaft can hang vertically by its weight when the hub frame is in a pivoted elevated position above the turntable.

3. A disc clamp device as set forth in claim 1, wherein said hub frame is of the one-way closing type.

4. A disc clamp device as set forth in claim 1, wherein said hub shaft is hung on said hub frame by said stop member with a washer.

* * * * *